United States Patent [19]
Knez, Jr.

[11] Patent Number: 5,238,195
[45] Date of Patent: Aug. 24, 1993

[54] METHOD FOR RECYCLING WALLBOARD

[75] Inventor: John S. Knez, Jr., Tigard, Oreg.

[73] Assignee: Knez Building Materials Company, Tigard, Oreg.

[21] Appl. No.: 977,678

[22] Filed: Nov. 18, 1992

Related U.S. Application Data

[63] Continuation-in-part of Ser. No. 737,997, Jul. 30, 1991, Pat. No. 5,183,213.

[51] Int. Cl.$^5$ .............................................. B02C 23/00
[52] U.S. Cl. ........................................ 241/24; 241/30; 241/DIG. 38
[58] Field of Search .................... 241/24, 30, 79, 176, 241/299, 18g333G5 38

[56] References Cited

U.S. PATENT DOCUMENTS

| | | |
|---|---|---|
| 981,445 | 1/1911 | Martin et al. |
| 1,516,913 | 11/1924 | Cramm |
| 2,600,508 | 6/1952 | Lehman et al. |
| 3,727,846 | 4/1973 | Rader .................. 241/243 X |
| 3,749,324 | 7/1973 | Hyde |
| 3,811,624 | 5/1974 | Giorgi |
| 3,862,719 | 1/1975 | Muller .................. 241/183 X |
| 3,863,847 | 2/1975 | Day et al. |
| 3,951,735 | 4/1976 | Rondo et al. .................. 264/113 X |
| 4,003,164 | 1/1977 | Carpenter, Jr. et al. ........ 241/183 X |
| 4,035,790 | 7/1977 | Farmer .................. 241/36 |
| 4,036,440 | 7/1977 | Mäkilä et al. |
| 4,044,695 | 8/1977 | Mackenzie et al. .... 241/DIG. 38 X |
| 4,148,952 | 4/1979 | Nelson et al. .................. 241/3 X |
| 4,265,408 | 5/1981 | Voelskow |
| 4,398,673 | 8/1983 | Gonnason |
| 4,634,060 | 1/1987 | Riemann et al. |
| 4,801,101 | 1/1989 | Dreyer et al. .................. 241/240 |
| 4,919,722 | 4/1990 | Vasquez et al. |
| 4,926,601 | 5/1990 | Musschoot .................. 241/183 X |
| 4,949,907 | 8/1990 | Bogdanov et al. |
| 4,959,272 | 9/1990 | Long .................. 428/537.7 |
| 4,995,561 | 2/1991 | Yukimi .................. 241/183 X |
| 5,100,063 | 3/1992 | Bauer |

OTHER PUBLICATIONS

Domtar Gypsum America Inc. Tacoma Plant Tour Guide brochure 4 pp.

*Primary Examiner*—Mark Rosenbaum
*Assistant Examiner*—Francis Chin
*Attorney, Agent, or Firm*—Klarquist, Sparkman, Campbell, Leigh & Whinston

[57] ABSTRACT

A method for recycling wallboard employs a tumbling barrel for receiving wallboard pieces and metal weights. The tumbling barrel is sealed and the barrel is rotated so as to drop the weights against the wallboard. Once the materials are separated into gypsum and relatively large pieces of paper, the barrel doors are opened and the materials are transferred to a vibrating conveyor including a number of filtering screens for segregating the gypsum and the paper. Reclaimed gypsum from this process then may be mixed as a large portion of the total gypsum used in the manufacture of new wallboard.

20 Claims, 8 Drawing Sheets

METHOD FOR RECYCLING WALLBOARD

This application is a continuation-in-part of copending U.S. patent application Ser. No. 07/737,997, filed Jul. 30, 1991, by the same inventor, now U.S. Pat. No. 5,183,213.

This invention relates to a recycling method, and more particularly to a method for recycling wallboard by separating the gypsum and paper facing components and manufacturing new wallboard from the reclaimed gypsum.

BACKGROUND OF THE INVENTION

Wallboard, a common construction material, comprises a gypsum core sandwiched between two layers of paper. Manufacturers and vendors of wallboard as well as builders employing wallboard in their construction projects typically generate wallboard scrap as a result of trimming board pieces to fit a particular application. Substantial amounts of scrap are also produced in the demolition of buildings. With ever increasing scarcity of dump space and elevated dumping fees, a significant expense can be incurred in disposing of the scrap material. Moreover, some general purpose dumps do not accept wallboard fragments, requiring disposal in special hazardous waste sites.

Increased disposal costs raise the desirability of recycling the gypsum and paper within the wallboard. Not only would the disposal problem be solved but also selling the recycled components could generate additional income.

The reclaimed gypsum may be more economical to use in the manufacture of new wallboard than newly-mined raw gypsum due to the availability of the reclaimed gypsum nearer the manufacturing plant and possibly lower recovery costs than are experienced in mining raw gypsum ore. Gypsum ore mines generally are located great distances from the manufacturing plants which entails higher transport costs.

Prior attempts at recycling wallboard have included processing the gypsum board through a hammer mill to pulverize the gypsum and remove the paper facings. However, such methods are undesirable in that the hammer mill finely pulverizes the paper making separation of the gypsum and paper difficult or impossible. The resulting mixture is unusable. Reducing the speed of operation of the hammer mill as an attempt to resolve this pulverizing problem has not been effective.

Another attempt at recycling wallboard comprised passing the board fragments through a shredder, for example, a garden-type shredder or grinder. However, this technique still does not produce a consistent output of material which is well adapted for separation.

Another drawback of prior recycling methods and apparatus relates to the considerable amount of gypsum dust produced during crushing which causes a potential health hazard for workers who breath the dust.

Each of these prior methods of attempting to reclaim gypsum from wallboard have been less successful due to their costs and inability to provide gypsum of sufficient purity to be acceptable as a large portion of the gypsum used in wallboard.

SUMMARY OF THE INVENTION

A wallboard recycling method in accordance with the present invention employs a tumbling barrel mounted so as to be driven in a rotary fashion. The barrel is provided with a door through which gypsum board fragments and weights such as metal scrap are inserted. The interior surface of the barrel carries a number of baffles or fins for aiding in a process of breaking up the wallboard. Once the board and weights are placed within the barrel, the barrel is closed, providing a seal for preventing gypsum dust from escaping during the process, and the barrel is then rotated at a fairly low speed for a period of time until the gypsum and paper are separated. The gypsum, paper and weights are then removed from the tumbling barrel and placed on a vibrating conveyor provided with a number of screens and traps for segregating the constituent materials. The gypsum falls into one or more collection bins through a series of screens while the vibrating action of the conveyor causes the paper to collect at a trap and fall off into another collection bin. The weights used in the crushing process may also be collected at a trap point and reused. The process according to the present invention separates fairly large pieces of paper which are easily separable from the gypsum. The resultant reclaimed gypsum has been found to be acceptable for use as a large percentage of the total gypsum used in the manufacture of wallboard.

It is an object of the present invention to provide an improved method for recycling wallboard.

It is another object of the present invention to provide an improved method for recycling wallboard in a manner which minimizes dust problems.

It is another object of the present invention to provide an improved method for producing recyclable wallboard constituents of consistent size.

A further object of the invention is to provide a novel method for using gypsum reclaimed in the recycling process for manufacturing new wallboard.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
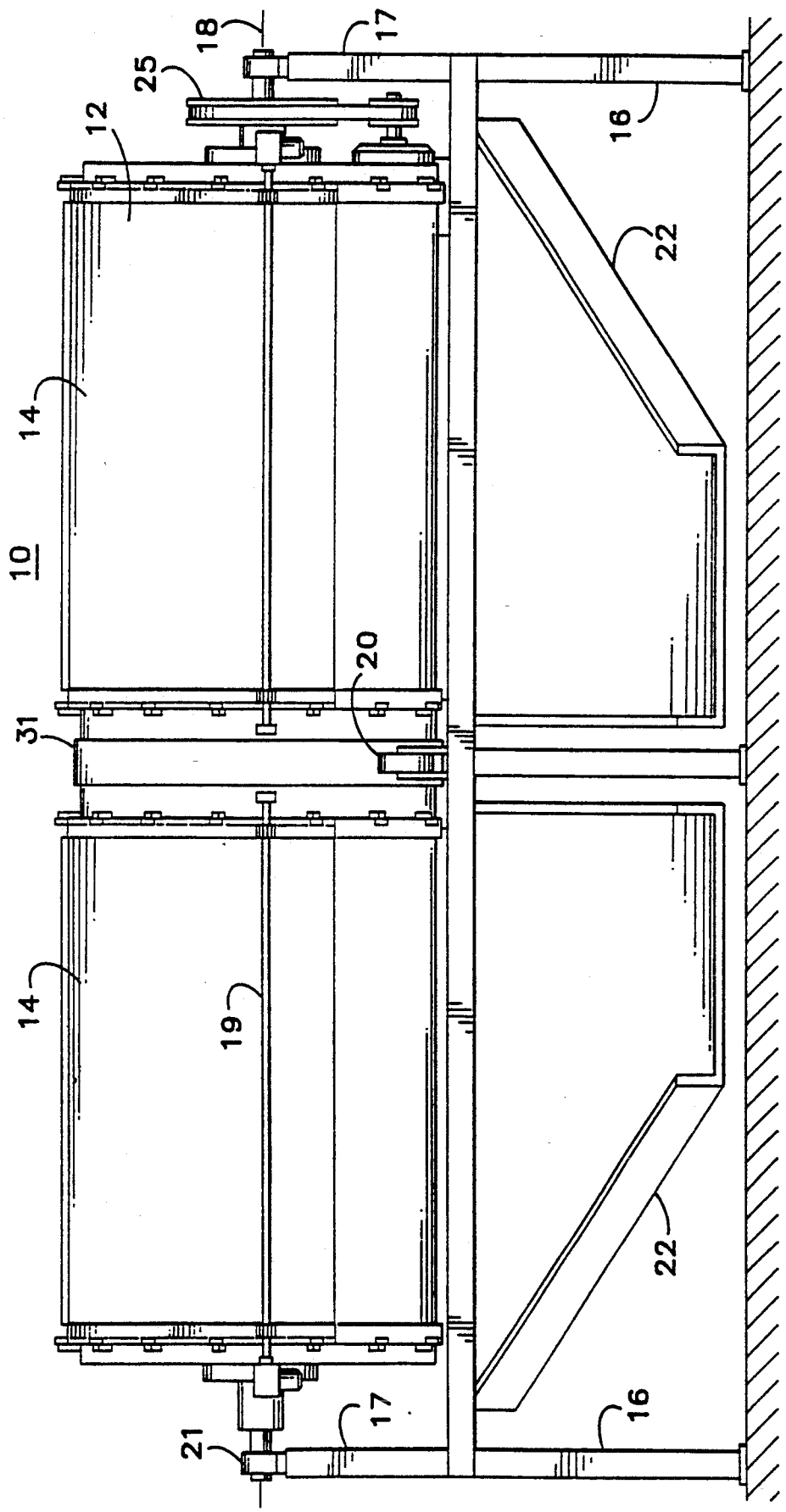
FIG. 1 is an elevational view of tumbling apparatus employed according to the present invention.
Figure 2:
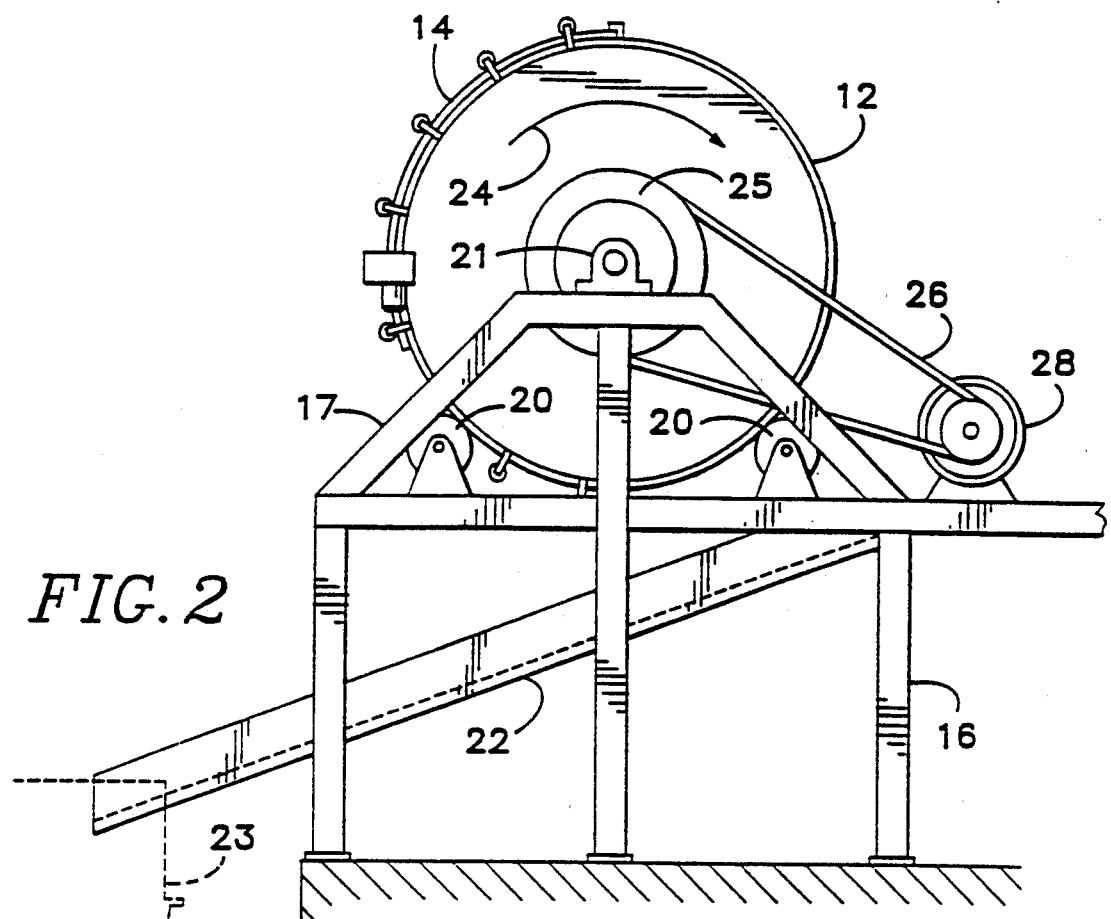
FIG. 2 is a side view of the FIG. 1 tumbling apparatus.

Referring now to FIGS. 1 and 2, elevational and end views of apparatus 10 are shown which is operable in reclaiming gypsum according to the present invention for recycling wallboard. The apparatus includes a tumbling barrel 12 having side doors 14 for providing sealable access to the barrel interior through which wallboard pieces and weights such as metal scrap may be inserted. Support frame 16 carrying support arms 17 rotatably mounts the barrel at ends of arms 17 for providing free rotation around horizontally disposed, longitudinal axis 18. The barrel is also supported centrally (and may be supported at each end) by front and rear rollers 20 mounted to the support frame. The rollers fit within a roller track 31 located around the circumference of the barrel. The barrel rotates about axis 18 on bearings 21 as driven by pulley 25 fixedly attached to one end of the barrel and receiving a drive chain or belt 26 driven by motor 28. The rotation direction is indicated by direction arrow 24 in FIG. 2. A dump table or chute 22 is substantially coextensive beneath the barrel and slants forwardly from the top of support frame 16 near the rear thereof and downwardly to the base of frame 16 at the front thereof for guiding material dumped from barrel 12 onto conveyor 23 for separation of material. The details and operation of conveyor 23 are subsequently described in conjunction with FIGS. 5, 6 and 7.

Figure 3:
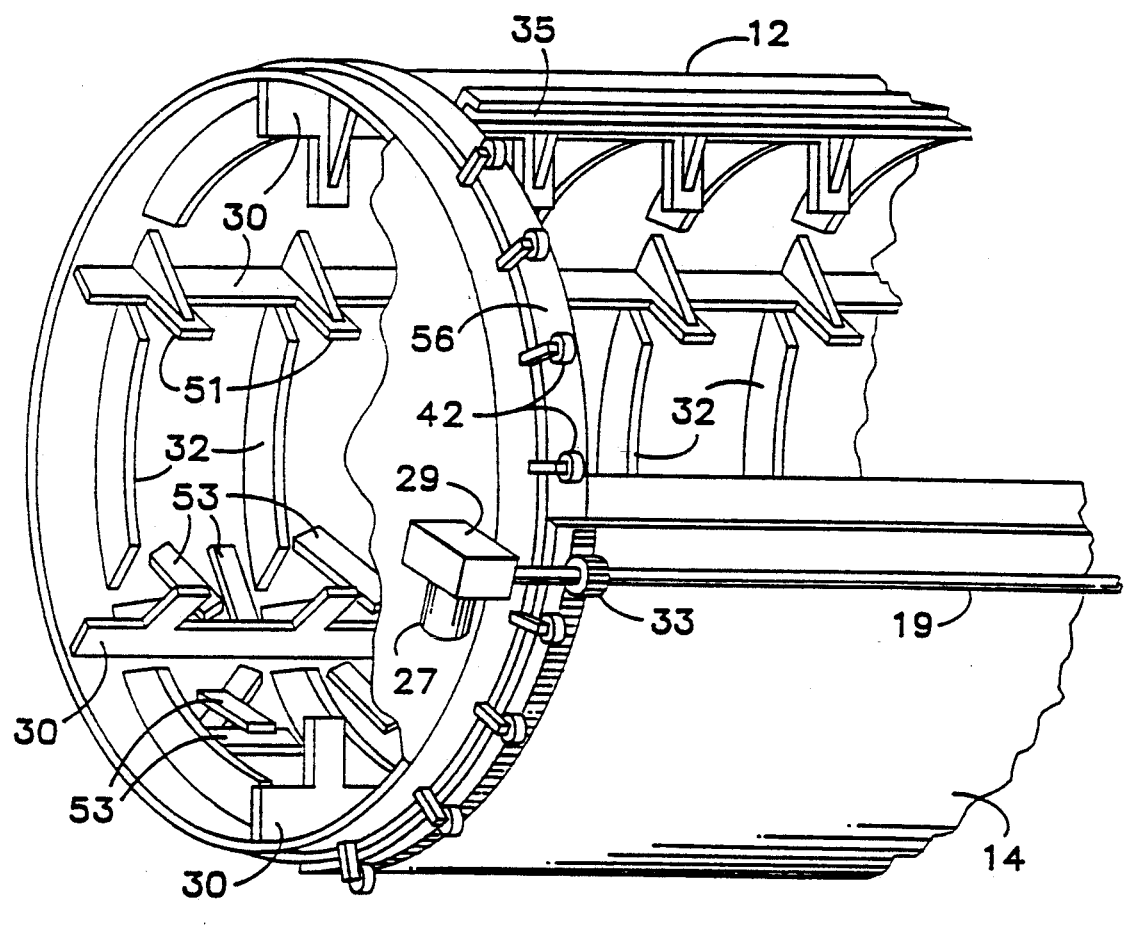
FIG. 3 is a perspective, cut-away view of the tumbling apparatus illustrating the interior thereof.

Referring now to FIG. 3, comprising a cut-away view of barrel 12 illustrating the interior thereof, a number of regularly spaced longitudinal baffle members 30 extend along the length of the interior of the barrel. The baffle members 30 are securely attached to the interior of the barrel and together with inwardly extending jibs 51 provide a resting point for loose weights 53 and wallboard material (not shown in this figure) so as to carry the weights and wallboard material up and around with the rotation of the barrel and then drop them centrally of the barrel in response to gravity. A series of regularly spaced circumferential fins 32 in line with the jibs 51 are placed between and substantially perpendicular to the orientation of the baffle members. The process of dropping allows weights 53 to impact the wallboard particles, smashing the particles against the interior surfaces of the barrel, thereby breaking the board into smaller pieces and separating the paper from the gypsum.

Figure 4:
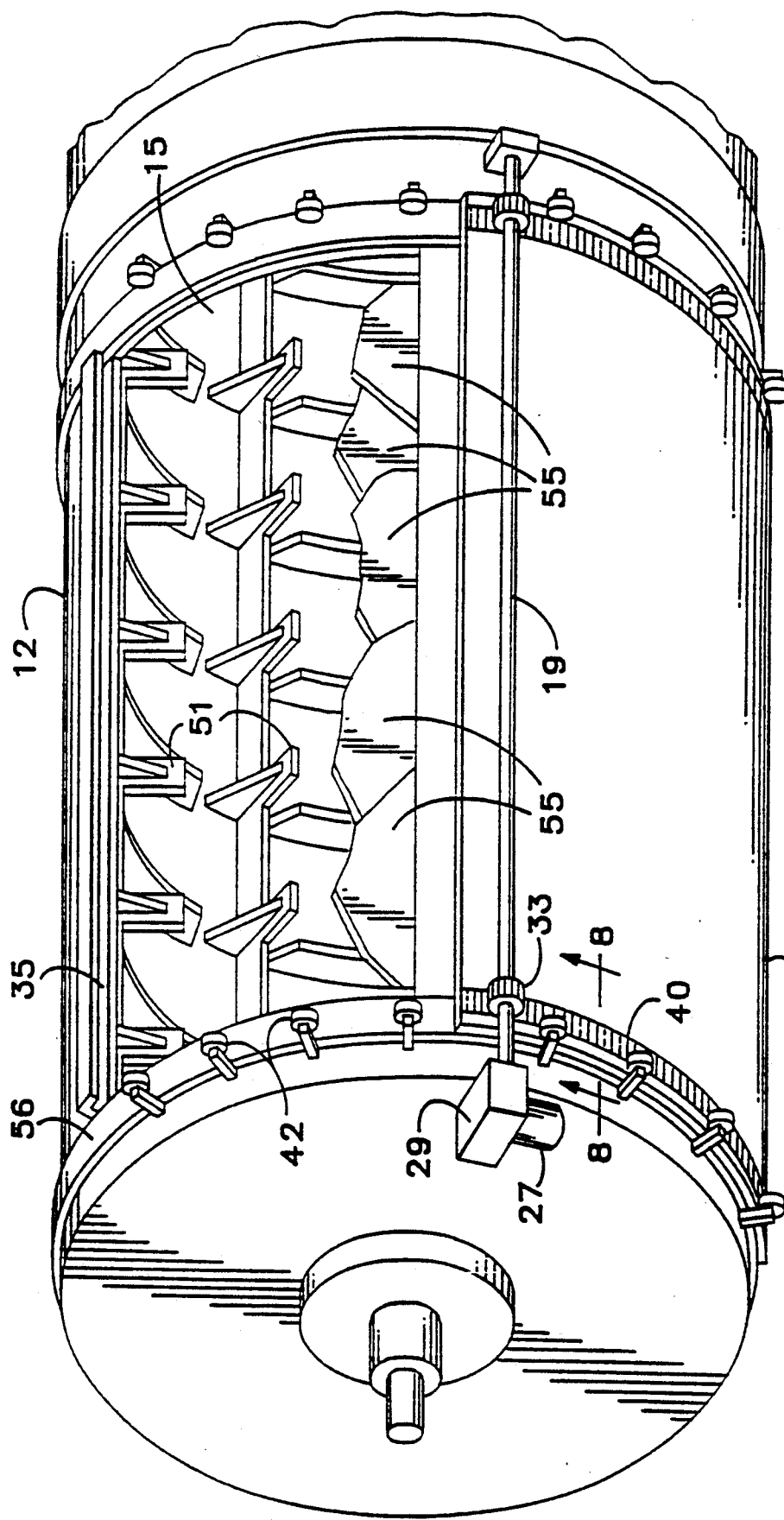
FIG. 4 is a perspective view of the tumbling apparatus illustrating placement of wall board pieces therewithin.

Referring to FIG. 4, the wallboard pieces 55 are shown inserted in tumbling barrel 12. Door 14, shown in an open position, normally covers opening 15, the door being semicylindrical in shape and slidably mounted so as to slide over and cover the opening 15. The door movement is driven by a rack and pinion system comprising a pair of pinions 33 engaging rack segments 40 mounted on the left and right door edges. A pinion is placed at the left end and at the right edges of the door, supported and powered by drive shaft 19 which extends substantially across the length of door 14. Drive shaft 19 is powered by a hydraulic motor 27 mounted on one end of the barrel 12 with the motor rotation being translated to rotation of shaft 19 by right angle bearing box 29. To close the door, the motor is powered so as to revolve shaft 19 thereby causing pinions 33 to turn and rack segments 40 and door 14 to slide toward a closed position on ultra high molecular weight plastic strips 56. The pinions continue to rotate when the door is being closed to slide the door until the door is firmly seated in slot 35 which extends longitudinally along the edge of opening 15. The slot may be ramped such that, as it receives the door, it tends to push the door more tightly against the strips 56 for substantially sealing the opening. Once the tumbling process is completed, the motor 27 is operated in a reverse direction causing the pinions 33 to rotate in a direction so as to cause door 14 to open, thereby allowing the contents of the barrel to be removed or dumped onto slanting table or chute 22 as the barrel is rotated.

Figure 5:
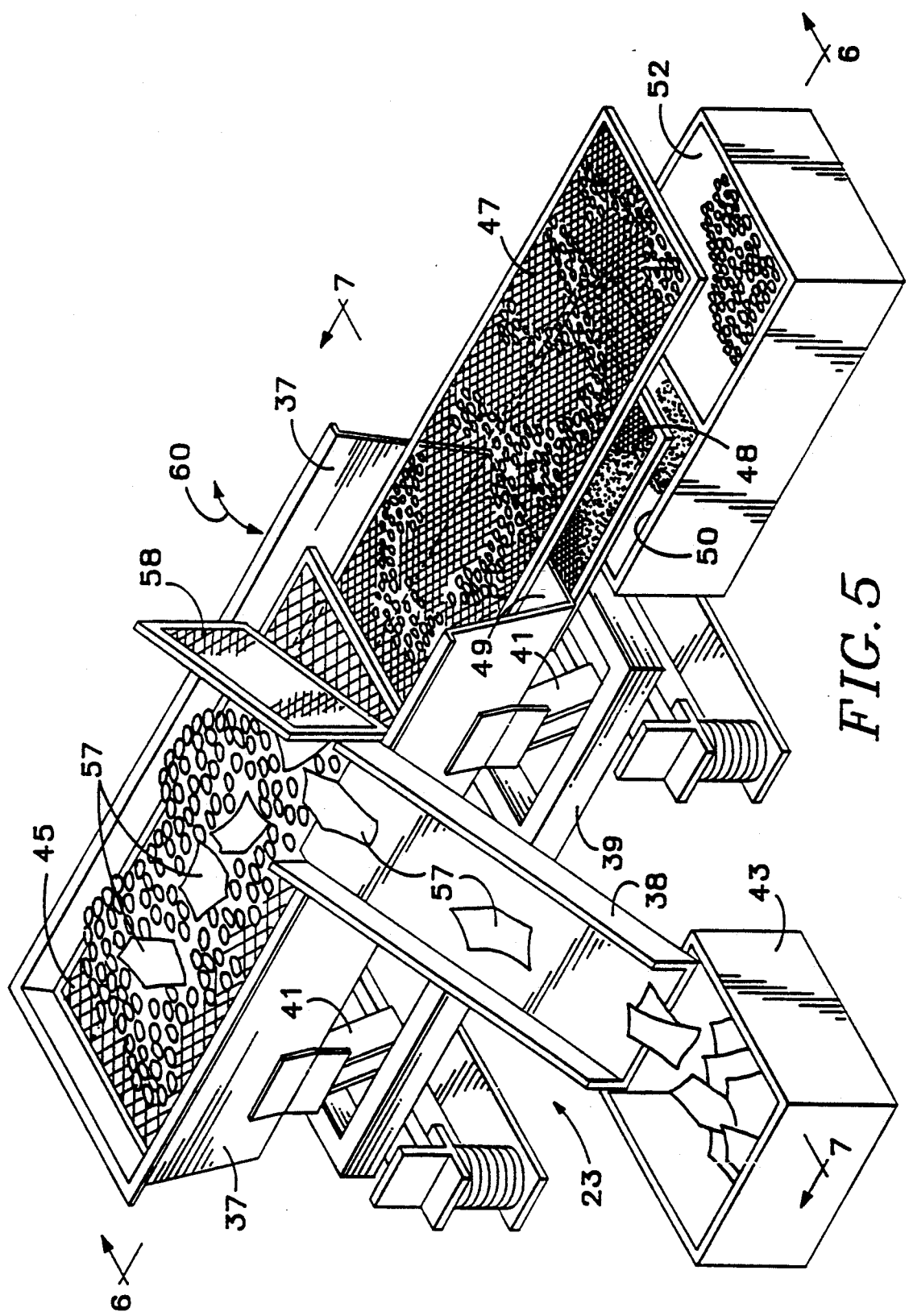
FIG. 5 is a view of a separating conveyor employed according to the present invention.
Figure 6:
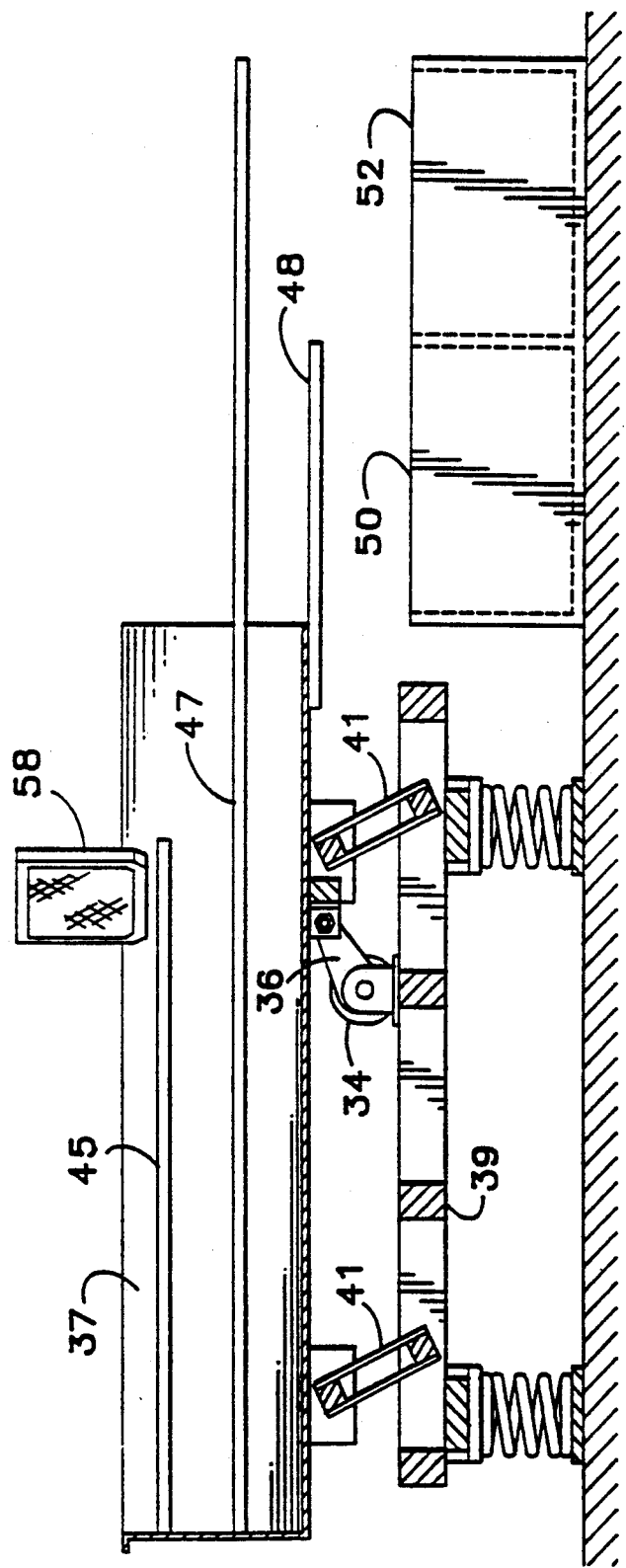
FIG. 6 is a longitudinal cross section of the FIG. 5 conveyor.
Figure 7:
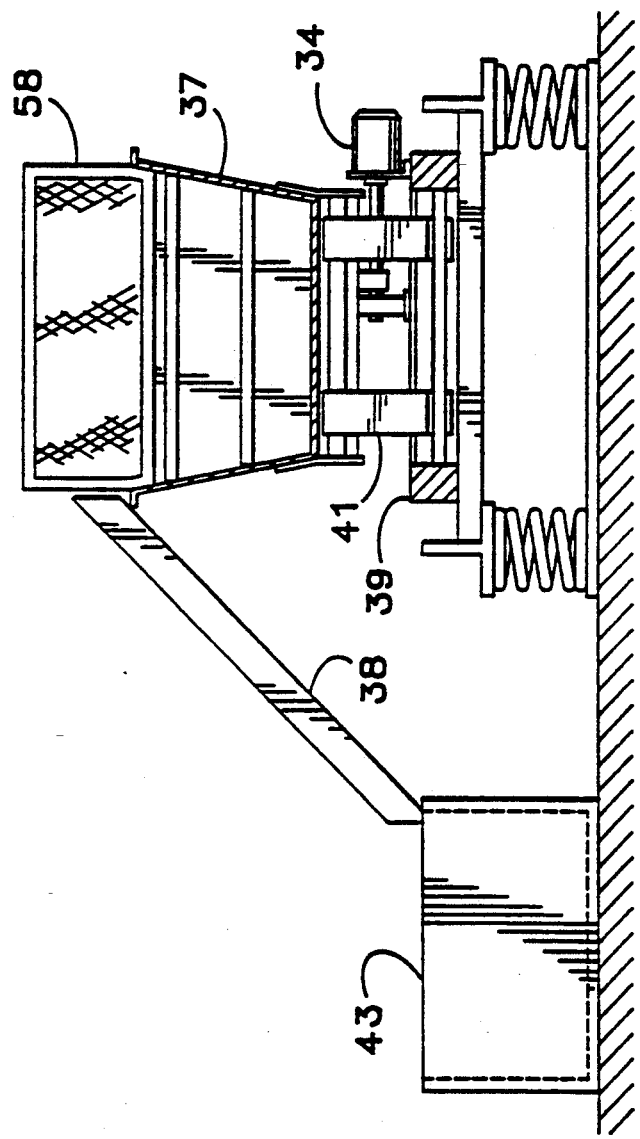
FIG. 7 is a cross section of the conveyor taken at 7—7 in FIG. 5.

Referring now to FIGS. 5-7, comprising views of separation, or segregation, apparatus employed according to the present invention, a vibrating conveyor 23 supports a number of substantially horizontal filtering screens for segregating the weights, gypsum, and paper. A vertical trap screen 58 mounted diagonally across conveyor pan assembly 37 prevents weights and paper from continuing past its location thereby sorting out these constituents. Pan assembly 37 is affixed to conveyor base 39 via rocker arms 41 which are adapted to rock conveyor pan assembly 37 with a substantially upward and somewhat forward motion with respect to conveyor base 39. The conveyor vibrates in a direction substantially along line 60 as driven by conveyor motor 34 and drive assembly 36 so as to move articles on the conveyor somewhat to the right in the FIG. 5 view. Alternatively, the conveyor can be slanted slightly downwardly to the right. The conveyor pan and drive mechanism may comprise a vibrating conveyor manufactured by Carrier Vibrating Equipment, Inc.

The conveyor further carries a chute 38 attached to the side of the pan assembly just forward (to the left) of where stop screen 58 spans the pan assembly on the side of the pan where the farthest downstream end of trap screen 58 is located. Chute 38 extends from the side of the pan assembly downwardly and serves to carry away paper material and metal weights caught by stop screen 58. Paper bin 43 is positioned beneath chute 38.

In operation, steel weights and paper particles collect at stop screen 58 and the vibrating action of the conveyor urges the paper particles along screen 58 and over the edge of pan assembly 37 into chute 38, allowing gravity to carry the paper particles into paper bin 43. The paper and steel trap 58 is oriented diagonally with respect to the length of pan assembly 37 so as to guide the paper towards chute 38.

A number of screens are suspended substantially horizontally within the interior of pan assembly 37, in parallel relation with the pan bottom, to assist in the separation process. A first coarse screen 45 is positioned nearest the top edge of the conveyor pan and extends from a closed end of the conveyor pan to slightly past trap 58. The coarse screen 45 is chosen with apertures which allow substantially all the gypsum particles to fall therethrough while preventing the weights and paper pieces from passing. The screen may have openings in a range of two to four inches, and preferably about three inches, to allow three-inch minus material to pass therethrough.

Also positioned within the pan assembly a distance below the coarse screen is a medium screen 47. The medium screen extends substantially the entire length of the pan assembly and for a distance beyond the end thereof. The medium screen openings are such that moderately sized and smaller gypsum particles will fall therethrough, but particles larger than a predetermined size will remain above the medium screen. The particles which fall through medium screen 47 are then allowed to fall to the conveyor pan bottom 49.

The vibrating action of the conveyor urges the various particles towards the open (right) end of pan assembly 37 wherein a fine screen 48 is positioned and extends outwardly from the open pan end for a short distance. The fine screen is such that only the finest particle sizes will pass therethrough. Placed beneath fine screen 48 is material collection bin 50 for receiving the particles of such size, the fine screen 48 extending so as to cover the entire top of fine bin 50. Placed next to fine bin 50 is bin 52 for receiving particles which are too coarse to pass through screen 48, i.e., moderate sized particles of gypsum. Medium screen 47 extends so as to cross over both fine bin 50 and medium bin 52. Any particles which were too large to pass through medium screen 47 but small enough to pass through coarse screen 45 will then fall off the end of medium screen 47, bypassing both fine bin 50 and medium bin 52. Another collection bin (not shown) is suitably located below the end of screen 47 so as to collect these moderately coarse materials if desired, as well as any steel pieces passing through screen 45.

While the illustrated embodiment employs a particular number of separation screens, it should be understood that a greater or lesser number of screens may be utilized to achieve the degree of particle separation desired.

Figure 8:
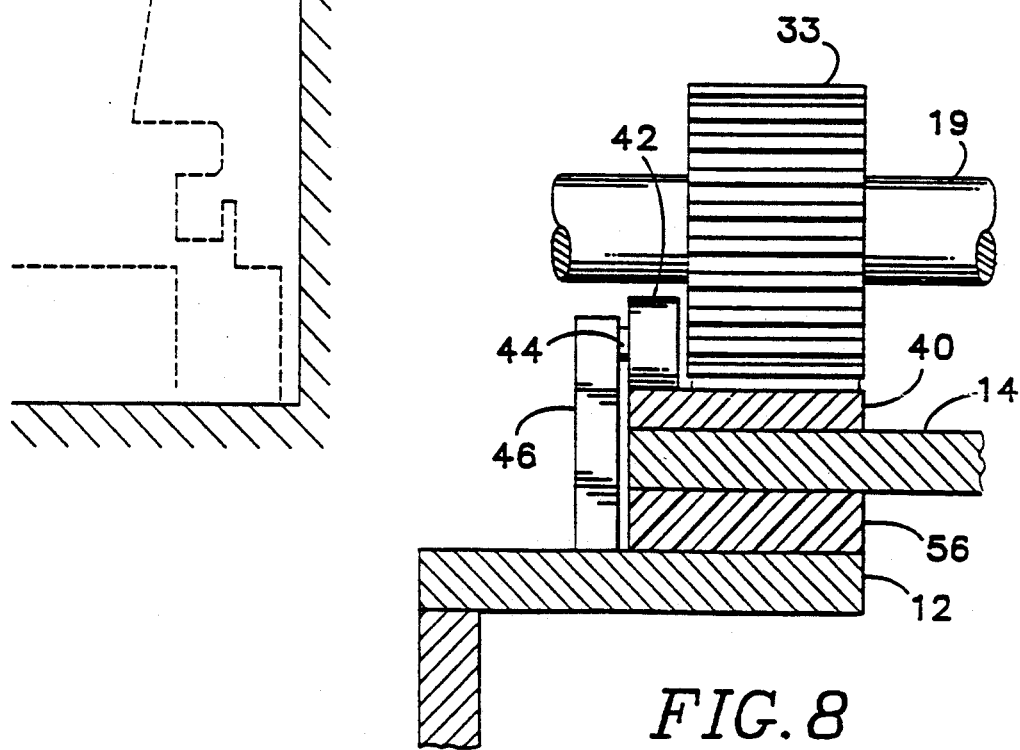
FIG. 8 is a cross section of door closing drive mechanism taken along line 8—8 in FIG. 4.

Referring now to FIG. 8, a cross section of the barrel door drive mechanism taken along line 8—8 of FIG. 4, ultra high molecular weight plastic strips 56 line the opening 15 into the barrel 12. The strips provide a durable yet relatively low friction surface upon which door 14 slides. Rack segment 40 is welded to and is substantially coextensive with the edge of door 14 providing teeth for mating with pinion 33 for powering the door open and shut. The outermost edge of the rack segment is smooth, extending along substantially the length of the rack where cam rollers 42 ride. Each cam roller 42 rotates about a shaft or pin 44 which is received by shaft support 46 attached to barrel 12. The cam rollers are provided to secure the door in place, i.e., in a rotational track.

Considering operation of the present invention, wallboard pieces 55 to be recycled are placed within barrel 12 together with a number of weights 53 which may comprise flat scrap steel or steel balls, after which the barrel doors 14 are closed. The barrel is then rotated for a relatively short time duration as it separates gypsum and paper, depending somewhat on the number of weights and the amount of wallboard material placed within the barrel. Twenty to thirty minutes is appropriate. The paper separates into fairly large pieces and the barrel should be emptied at this point. The rotation speed is fairly low, for example, approximately eleven rpm in a preferred embodiment, but should be under fifty rpm. After the tumbling has continued for a period sufficient to break up the wallboard pieces as described, the doors 14 are opened and the mixture is dumped out onto slanting table or chute 22 (FIG. 2) as the barrel continues to rotate. The conveyor 23 then receives the wallboard materials and usually some weights for separation. (Some of the weights may remain behind in the tumbling barrel and may not be carried to the conveyor. The others are later returned to the barrel.) In the illustrated embodiment, the conveyor is placed below the base of the tumbling apparatus so as to receive the recycled material directly from the barrel as delivered by slanting table or chute 22.

The vibrating conveyor 23 urges the weights and material from the closed end of the pan assembly of the conveyor towards the open (right) end thereof. The screen 58 traps the paper and any steel weights while the gypsum particles fall through coarse screen 45. Almost all of the paper comprising comparatively large pieces 57 collects at the trap screen and is urged down paper chute 38 into paper collection bin 43. Various sized gypsum pieces continue down the conveyor toward the open end of pan assembly 37 with the moderate size pieces remaining above the medium screen and smaller pieces falling therebelow. The fine screen sifts out the finest particles into fine bin 50 while larger particles fall into medium bin 52. Still larger sized particles of gypsum then fall off the end of medium screen 47 into yet another bin. The gypsum can be reused to form wallboard and for other purposes.

Tumbling the wallboard according to the present invention is advantageous in that the paper facing of the wallboard is removed in relatively large pieces. These large pieces are easy to separate, and the vibrating motion of the conveyor is such as to remove the paper at the trap point. The method and apparatus also generates gypsum particles of consistent size, providing reproducible recycling results.

It has been found that the method and apparatus described above is adequate to remove up to ninety to ninety-five percent of the original paper covering for the wallboard. Thus, reclaimed gypsum which exits from the screens contains in the range of no more than five to ten percent of the original paper which previously coated the wallboard. The residual paper in the reclaimed gypsum is less than one percent by weight of the reclaimed gypsum product. This has been found to be acceptable for use in manufacturing new wallboard using reclaimed gypsum.

Figure 9:
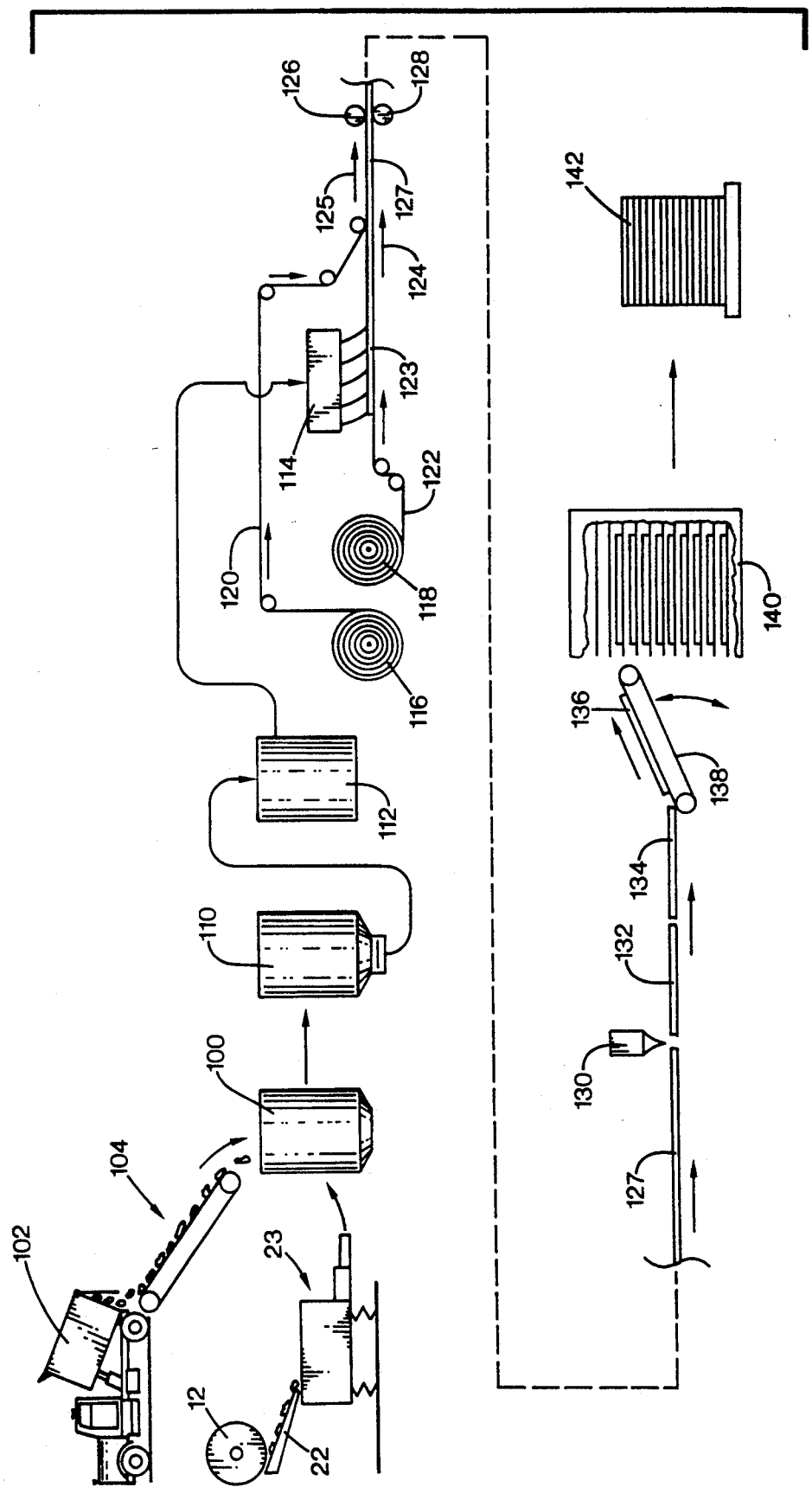
FIG. 9 is a schematic illustration of a method for manufacturing wallboard using both reclaimed and raw gypsum.

Referring to FIG. 9, a schematic illustration is shown for a method of manufacturing wallboard using gypsum reclaimed as described above.

At 12 is indicated schematically the above-defined tumbling barrel, at 22 is the dump chute, and at 23 the vibrating conveyor with separating screens for segregating the weights, gypsum, and paper.

The reclaimed gypsum from the previously described recycling process is in chunks, or nuggets, preferably in a three inch minus size, excluding dust particles. As mentioned previously, the reclaimed gypsum has had approximately ninety to ninety-five percent of the original paper covering removed. The reclaimed gypsum includes the additive ingredients that were previously introduced into the gypsum core in its earlier manufacture. Such ingredients will be discussed below in relation to manufacture of new wallboard.

Explaining further, and as an example, one-half inch thick wallboard has a weight of 1.7 pounds per square foot. The reclaimed gypsum exiting the outfeed of screening conveyor 23 has less than one percent by weight of residual paper which formed the original covering for the wallboard. This reclaimed gypsum has been found acceptable for use in the production of new wallboard.

Referring again to FIG. 9, the reclaimed gypsum is introduced to a primary crusher 100. Raw mined gypsum also may be delivered, as illustrated, from a truck 102 and conveyor 104, to crusher 100. The raw gypsum (composed largely of calcium sulphate) is mixed in crusher 100 with up to forty percent (40%) by weight of the reclaimed gypsum material from conveyor 23. The gypsum mixture introduced to crusher 100 may include from twenty to forty percent (20%–40%) reclaimed gypsum. The gypsum mixture is crushed to particles of one inch or less in crusher 100. The resultant crushed mix then is moved to an impact mill 110 where it is further comminuted and heated to remove a portion of the water existing in the raw gypsum.

From the mill the gypsum mixture moves to a mixing container 112 in which additives such as starch, glass fiber, foaming agents, and other chemicals, are added to form the desired characteristics of the gypsum core.

It should be noted here that the reclaimed gypsum which has been added in proportions up to forty percent of the total mix already includes additives from prior manufacture. This substantially reduces the amount of additives which need to be combined with the total mix in container 112. The reduction in need for additives is directly related to the proportion of reclaimed gypsum in the gypsum mixture. This provides additional savings for the manufacturer.

The resultant mixture is formed into a thick slurry which is transported through a hopper 114.

A pair of paper rolls 116, 118 discharge continuous surface sheets of covering paper 120, 122 along paths indicated by arrows 124, 125.

Discharge hopper 114 applies a slurry layer of mixed gypsum core material 123 on top of paper sheet 122 and sheet 120 is pressed against the top thereof. The resultant sandwich of materials 127 is compressed between rollers 126, 128 which may be spaced apart a selected distance to determine the thickness of the board produced. Common thicknesses are one-half, five-eighths, and three-quarters inch. The board 127 travels as a continuous sheet for quite some distance as the gypsum cures to an initial hardness. It then is cut into selected lengths by a knife 130. Individual sheets of wallboard 132, 134, 136 are then carried by a tiltable conveyor 138 to be placed on racks in a drying oven 140 for final curing.

After the individual sheets have been cured in the oven they are stacked in bundles as indicated at 142 for shipment.

It will thus be seen that a large portion of reclaimed gypsum, including previously mixed additives and with a minimum of its original residual paper coating, may be included with raw virgin gypsum to manufacture new wallboard. Since the reclaiming process described is inexpensive to operate and provides relatively clean reclaimed gypsum, it has been found to be usable at up to forty percent by weight of the total gypsum mixture.

Additional economies are obtained by using less resources for mining raw gypsum and transporting it from distant mining areas, and by requiring fewer additives in the mixing and production process. It has been found that the wallboard produced using such reclaimed gypsum is acceptable in the trade.

While a preferred embodiment of the present invention has been shown and described, it will be apparent to those skilled in the art that changes and modifications may be made without departing from the spirit of the invention. The appended claims are therefore intended to cover all such changes and modifications as fall within the true spirit and scope of the invention.

I claim:

1. A method for manufacturing wallboard using gypsum reclaimed from previously-manufactured board having a paper-clad gypsum core, the method comprising the steps of tumbling pieces of board with breaking elements to break the board and remove the paper from the gypsum core, segregating the paper from the gypsum to provide a quantity of reclaimed gypsum which has at least ninety percent of the paper removed therefrom, mixing the reclaimed gypsum with raw gypsum to provide a gypsum mixture, producing a slurry of said gypsum mixture, and depositing a quantity of said slurry in a layer between a pair of first and second surface sheets to form a sandwiched wallboard product.

2. The method of claim 1, wherein the step of mixing reclaimed gypsum with raw gypsum comprises placing in said mixture reclaimed gypsum in an amount up to 40% by weight of the gypsum mixture.

3. The method of claim 1, wherein the step of mixing reclaimed gypsum with raw gypsum comprises placing in said mixture reclaimed gypsum in an amount ranging from 20% to 40% by weight of the gypsum mixture.

4. The method of claim 1, wherein the step of segregating the paper from the reclaimed gypsum includes physical segregation whereby the reclaimed gypsum has less than one percent by weight paper content originating from the board from which the gypsum is reclaimed.

5. The method of claim 1, wherein the step of removing the paper from the gypsum core includes placing the board in a tumbling apparatus having an inner wall, placing in the tumbling apparatus with the board a plurality of loose removable weights sized to be capable of impacting against the board to break it apart when the tumbling apparatus is rotated, and moving the tumbling apparatus to cause the weights to impact against the board to break the board and separate the gypsum from the paper.

6. The method of claim 1, wherein the step of segregating the paper from the reclaimed gypsum includes the step of screening the mixture of paper and gypsum resulting from the tumbling step to physically segregate the paper from the reclaimed gypsum.

7. The method of claim 1, wherein the step of tumbling the pieces of board with breaking elements is conducted so that the paper is removed from the gypsum and the gypsum and paper are broken to such sizes that a majority of the gypsum will pass through a separating screen of three inch minus size and the majority of the paper will not pass such screen.

8. The method of claim 1, wherein the step of segregating the paper from the gypsum includes passing the mixture of materials resulting from the tumbling step over a separating screen having openings in a range of two inches to four inches, allowing reclaimed gypsum pieces to fall therethrough to a collection area with the majority of the paper from the tumbling step remaining on the screen, and removing the paper from the screen.

9. The method of claim 1, wherein the segregating step comprises placing the reclaimed gypsum and paper from the tumbling step on a vibrating screen, vibrating the screen to sift the gypsum through the screen and removing the paper from the surface of the screen.

10. The method of claim 1, wherein the reclaimed gypsum contains additives mixed therein in its original manufacture, and which further comprises a step of mixing selected additives into the gypsum mixture in quantities proportionally lower than would be required for a gypsum mixture composed solely of raw gypsum.

11. The method of claim 10, wherein the step of mixing selected additives into the gypsum mixture comprises causing the proportionality of the reduced need for additives to be directly related to the proportion of reclaimed gypsum used in the gypsum mixture.

12. The method of claim 1, wherein in the segregating step the reclaimed gypsum has at least ninety-five percent of the original paper removed therefrom.

13. A method for manufacturing wallboard using gypsum reclaimed from previously-manufactured board having a paper-clad gypsum core, the method comprising the steps of tumbling pieces of board with breaking elements to break the board and remove the paper from the gypsum core, segregating the paper from the gypsum to provide a quantity of reclaimed gypsum which has at least ninety percent of the paper removed therefrom and the paper accompanying the segregated gypsum constitutes less than one percent by weight of the reclaimed gypsum, mixing the reclaimed gypsum with raw gypsum to provide a gypsum mixture in which the reclaimed gypsum comprises between 20% and 40% by weight of the gypsum mixture, comminuting the gypsum mixture, producing a slurry of said gypsum mixture, depositing a quantity of said slurry in a layer between a pair of first and second surface sheets to form a sandwiched wallboard product, and curing said wallboard product.

14. The method of claim 13, wherein the reclaimed gypsum contains additives mixed therein in its original manufacture, and which further comprises a step of mixing selected additives into the gypsum mixture in quantities proportionally lower than would be required for a gypsum mixture composed solely of raw gypsum.

15. The method of claim 14, wherein the step of mixing selected additives to the gypsum mixture comprises causing the proportionality of the reduced need for additives to be directly related to the proportion of reclaimed gypsum used in the gypsum mixture.

16. A method for manufacturing wallboard using gypsum reclaimed from previously-manufactured board having a paper-clad gypsum core, the method comprising the steps of placing pieces of board in a tumbling apparatus having an inner wall, placing in the tumbling apparatus with the board a plurality of loose removable weights sized to be capable of impacting against the board to break it apart when the tumbling apparatus is rotated, and moving the tumbling apparatus to cause the weights to impact against the board to break the board and separate the gypsum from the paper, segregating the paper from the gypsum by passing the mixture of materials resulting from the tumbling step over a separating screen having openings in a range of two inches to four inches, allowing reclaimed gypsum pieces to fall therethrough to a collection area with the majority of the paper from the tumbling step remaining on the screen, and removing the paper from the screen, mixing the reclaimed gypsum with raw gypsum to provide a gypsum mixture, comminuting the gypsum mixture, producing a slurry of said gypsum mixture, depositing a quantity of said slurry in a layer between a pair of first and second surface sheets to form a sandwiched wallboard product.

17. The method of claim 16, wherein the step of mixing reclaimed gypsum with raw gypsum comprises placing in said mixture reclaimed gypsum in an amount between 20% and 40% by weight of the gypsum mixture.

18. The method of claim 16, wherein the step of segregating the paper from the reclaimed gypsum includes physical segregation whereby the reclaimed gypsum has less than one percent by weight paper content originating from the board from which the gypsum is reclaimed.

19. The method of claim 16, wherein the reclaimed gypsum contains additives mixed therein in its original manufacture, and which further comprises a step of mixing selected additives to the gypsum mixture in quantities proportionally lower than would be required for a gypsum mixture composed solely of raw gypsum.

20. The method of claim 19, wherein the step of mixing selected additives to the gypsum mixture comprises causing the proportionality of the reduced need for additives to be directly related to the proportion of reclaimed gypsum used in the gypsum mixture.

* * * * *